United States Patent [19]

Ishimaru

[11] Patent Number: 5,088,352
[45] Date of Patent: Feb. 18, 1992

[54] SYSTEM FOR CONTROLLING HYDRAULIC FLUID PRESSURE FOR V-BELT TYPE AUTOMATIC TRANSMISSION

[75] Inventor: Wataru Ishimaru, Ebina, Japan

[73] Assignee: Nissan Motor Co., Ltd., Yokohama, Japan

[21] Appl. No.: 348,837

[22] Filed: May 8, 1989

[30] Foreign Application Priority Data

May 6, 1988 [JP] Japan .................. 63-109166

[51] Int. Cl.⁵ .................. F16H 9/26; F16H 59/14
[52] U.S. Cl. ................. 74/867; 74/665 GE; 74/868; 474/28
[58] Field of Search ............ 74/665 GE, 867, 868; 475/198, 212; 474/18, 28

[56] References Cited

U.S. PATENT DOCUMENTS

| | | | |
|---|---|---|---|
| 4,294,137 | 10/1981 | Piret et al. | 74/665 GE X |
| 4,628,773 | 12/1986 | Itoh et al. | 474/28 X |
| 4,674,359 | 6/1987 | Hattori | 474/28 X |
| 4,685,357 | 8/1987 | Sawada et al. | 74/867 |
| 4,718,308 | 1/1988 | Haley | 474/28 X |
| 4,735,113 | 4/1988 | Yamamuro et al. | 74/866 |
| 4,736,652 | 4/1988 | Shimamoto | 74/665 GE |
| 4,772,249 | 9/1988 | Kouno et al. | 74/868 X |
| 4,798,561 | 1/1989 | Hattori et al. | 74/867 X |
| 4,895,552 | 1/1990 | Abo et al. | 474/18 X |
| 4,955,260 | 9/1990 | Oshidari | 74/868 |

FOREIGN PATENT DOCUMENTS

| | | |
|---|---|---|
| 53-137375 | 11/1978 | Japan . |
| 56-97661 | 8/1981 | Japan . |
| 57-191134 | 11/1982 | Japan . |
| 58-146756 | 9/1983 | Japan . |
| 60-249758 | 12/1985 | Japan . |
| 234539 | 9/1987 | Japan 74/867 |
| 63-31833 | 2/1988 | Japan . |
| 63-176862 | 7/1988 | Japan . |

Primary Examiner—Leslie A. Braun
Assistant Examiner—Khoi Q. Ta
Attorney, Agent, or Firm—Foley & Lardner

[57] ABSTRACT

An automatic transmission includes a gear power train and a V-belt type continuously variable power train which are connected in parallel between input and output shafts. A relatively low hydraulic fluid pressure is supplied to a follower pulley cylinder chamber when the V-belt type continuously variable power train is rendered inoperable, whereas a sufficiently high hydraulic fluid pressure is supplied to the follower pulley cylinder chamber when the V-belt type continuously variable power train is rendered operable, inducing a sufficiently high force which the follower pulley grips the V-belt with.

17 Claims, 8 Drawing Sheets

SYSTEM FOR CONTROLLING HYDRAULIC FLUID PRESSURE FOR V-BELT TYPE AUTOMATIC TRANSMISSION

BACKGROUND OF THE INVENTION

The present invention relates to a system for controlling hydraulic fluid pressure for an automatic transmission.

Laid-open Japanese Patent Application No. 60-249758 discloses an automatic transmission. This known transmission includes a gear power train and a V-belt type continuously variable power train. Power is transmitted via one of the above-mentioned two power trains in response to operating condition. When a large driving force is required, the gear power train is rendered operative to transmit power between the input and output shafts, while when a small driving force is required, the V-belt type continuously variable power train is rendered operative to transmit power between the input and output shafts.

In the known transmission, upon transmission of power via the gear power train, driver and follower pulleys and a V-belt drivingly connected between the pulleys rotate. Thus, there occurs frictional loss not only in the gear power train, but also in the V-belt type continuously variable power train, causing a drop in power transmission efficiency. Further, hydraulic fluid pressure is kept applied to cylinder chambers of the pulleys, inducing a loss on pump used as a source of pressurized hydraulic fluid. Besides, since the V-belt is always subject to tension, the durability of the V-belt and pulleys drops.

An object of the present invention is to solve the above-mentioned problems.

SUMMARY OF THE INVENTION

According to the present invention, there is provided a system for controlling hydraulic fluid pressure for an automatic transmission including an input shaft and an output shaft, the automatic transmission including a gear power train for transmitting power between the input and output shafts and a V-belt type continuously variable power train for transmitting power between the input and output shafts, and means for rendering the gear power train and the V-belt type continuously variable power train selectively operable, the V-belt type continuously variable power train being connected in parallel with the gear power train such that the V-belt type continuously variable power train does not transmit power between the input and output shafts when the gear power train is rendered operable to transmit power between the input and output shafts, while the gear power train does not transmit power between the input and output shafts when the V-belt type continuously variable power train is rendered operable to transmit power between the input and output shafts, the V-belt type continuously variable power train having a pulley unit including a driver pulley, a follower pulley, and a V-belt drivingly connected between the driver and follower pulleys, the system comprising; means for supplying a first hydraulic fluid pressure to the rendering means; means for supplying a second hydraulic fluid pressure to the pulley unit when the V-belt type continuously variable power train is to be rendered operable to transmit power between the input and output shafts, inducing a force which the follower pulley grips the V-belt with, rendering same operable to transmit power between the driver and follower pulleys, means for supplying a third hydraulic fluid pressure to the pulley unit when the V-belt type continuously variable power train is rendered inoperable to transmit power between the input and output shafts;

said third hydraulic fluid pressure being lower than said second hydraulic fluid pressure so that the force which the follower pulley grips the V-belt with drops when the pulley unit is supplied with said third hydraulic fluid pressure.

DETAILED DESCRIPTION OF THE INVENTION

Figure 1:
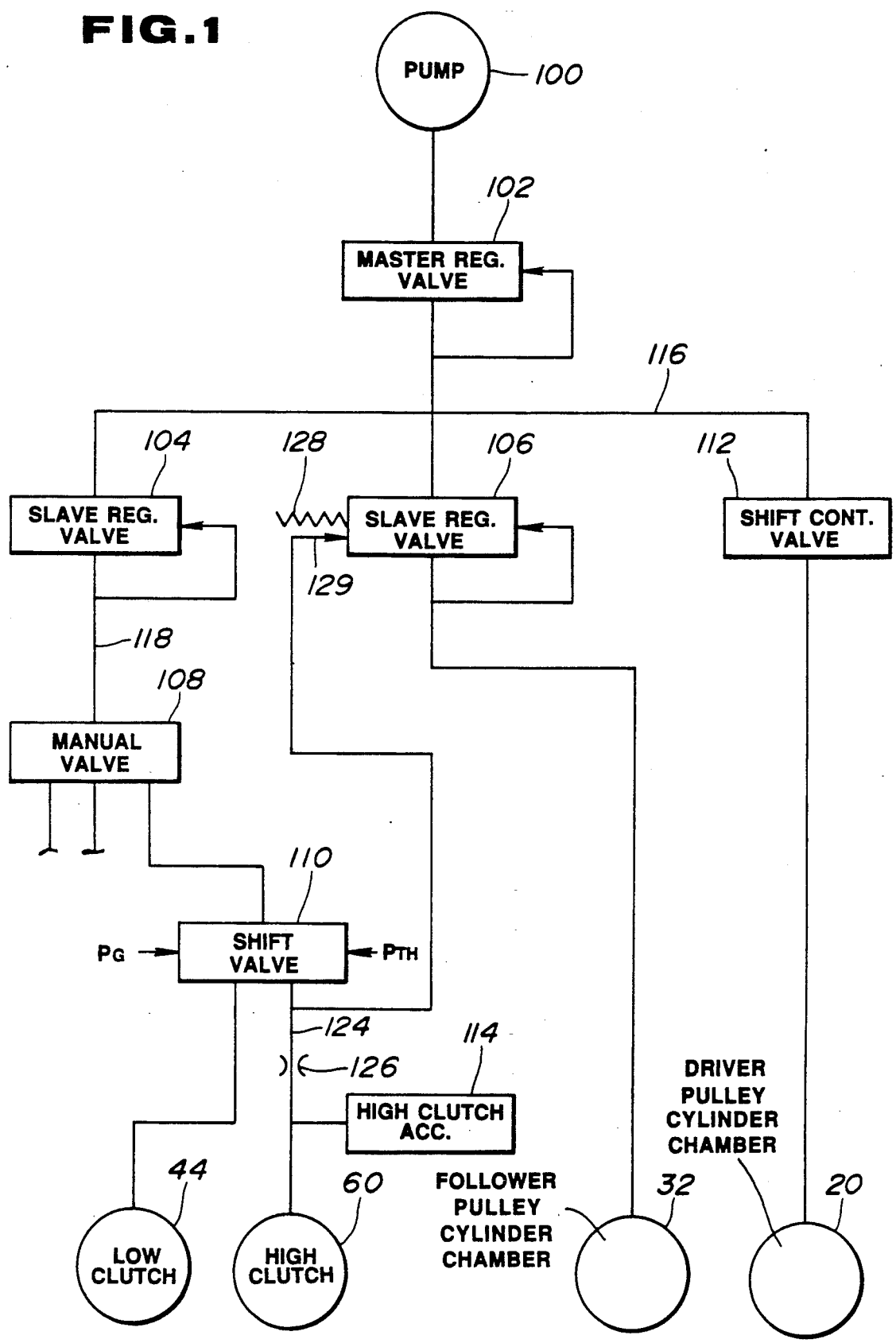
FIG. 1 is a block diagram of a first embodiment of a system according to the present invention.
Figure 2:
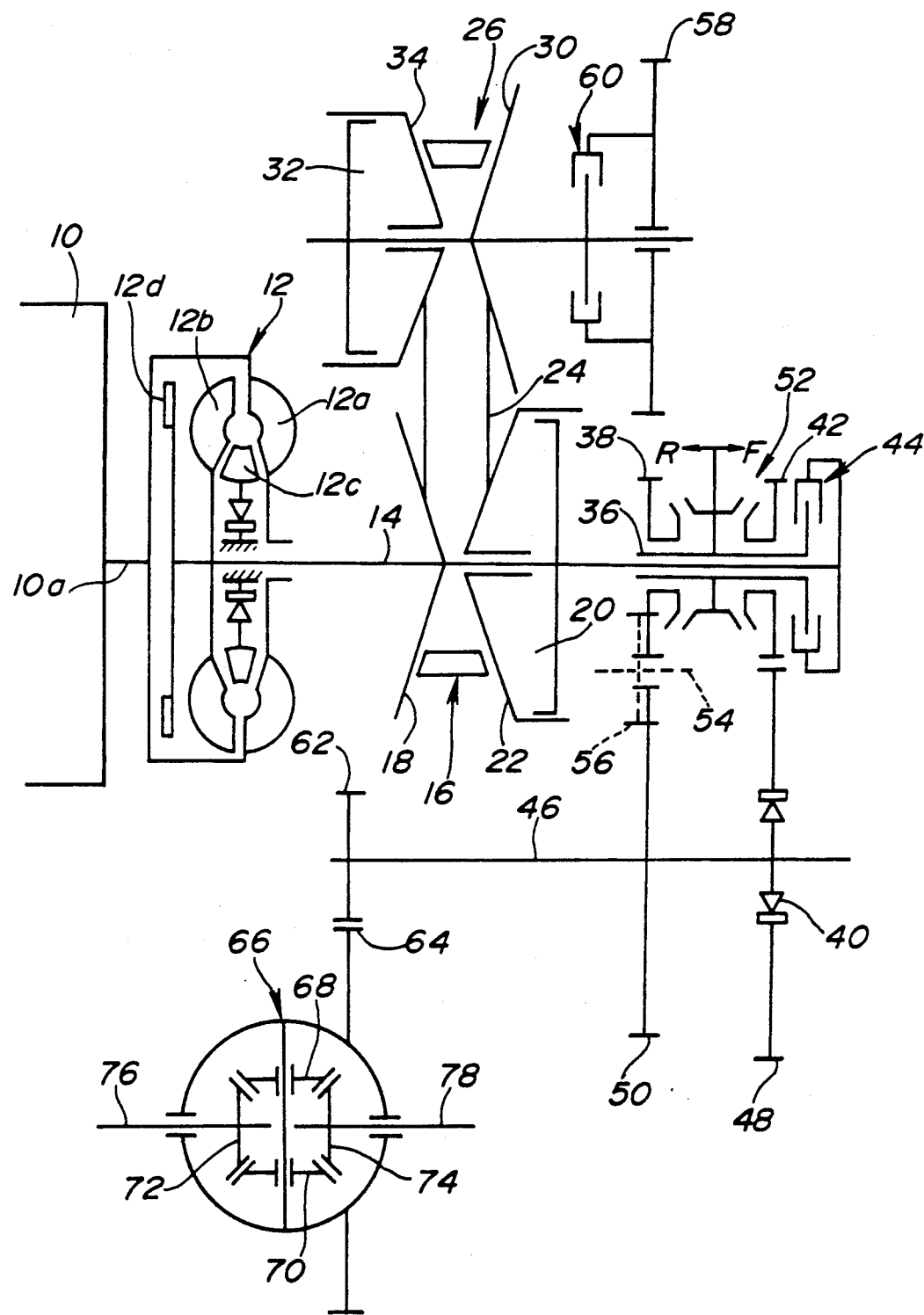
FIG. 2 is a schematic diagram of a transmission including a gear power train combined with a V-belt type continuously variable power train.
Figure 3:
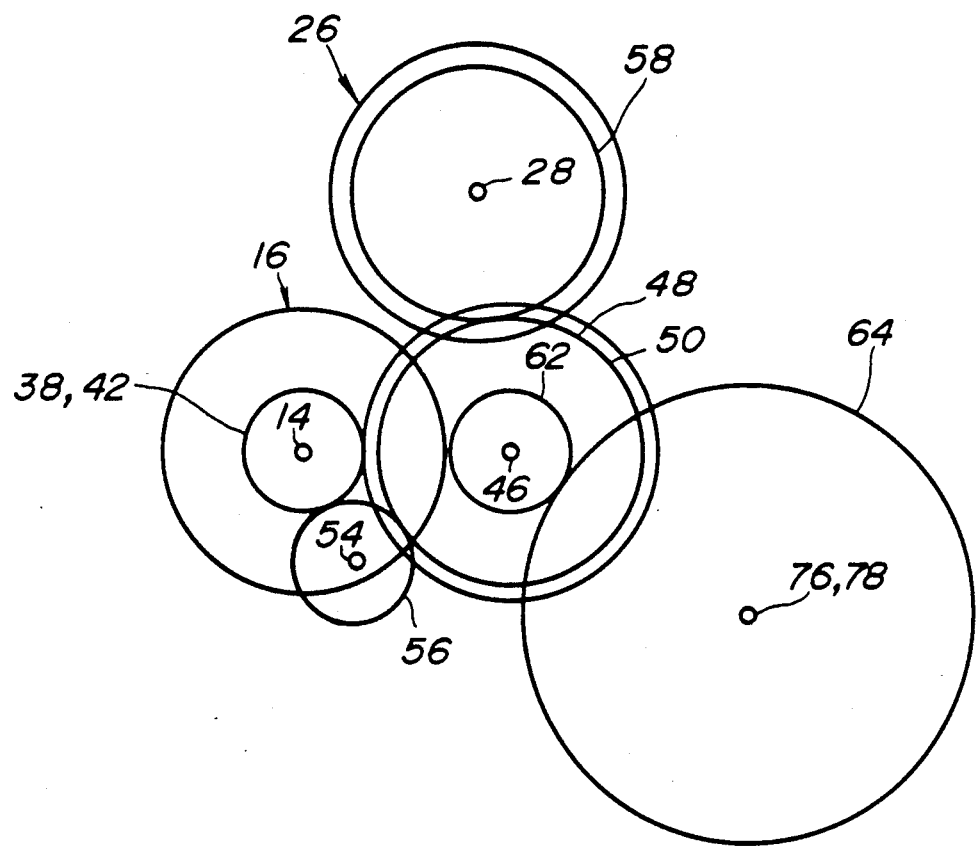
FIG. 3 is a diagram illustrating arrangement of a variety of different shafts of the transmission.

Referring to FIGS. 1 to 3, a first embodiment of a system according to the present invention is described.

Referring now to FIG. 2, an engine 10 is shown as having an output shaft 10a which a torque converter 12 is coupled in the conventional manner. The torque converter 12 includes, as usual, a pump impeller 12a, a turbine runner 12b, and a stator 12c. It also includes a lock-up clutch 12d which the pump impeller 12a and turbine runner 12b are selectively interconnected with. The turbine runner 12b of the torque converter 12 is drivingly connected to a driver shaft 14. On the driver shaft 14 is a driver pulley 16. The driver pulley 16 includes an axially stationary conical member 18 fixedly connected to the driver shaft 14, and an axially movable conical member 22 connected to the driver shaft 14 in opposed spaced relationship with the stationary conical member 18. The conical members 18 and 22 define therebetween a V-shaped pulley groove therebetween. The driver pulley 16 includes a driver pulley cylinder chamber 20. The movable conical member 22 is axially movable toward the stationary conical member 18 in response to hydraulic pressure developed in the driver pulley cylinder chamber 20, causing the V-shaped pulley groove to decrease its width. The driver pulley 16 is drivingly connected via a V-belt 24 to a follower pulley 26. The follower pulley 26 includes an axially stationary conical member 30 fixedly connected to a follower shaft 28, and an axially movable conical member 34 connected to the follower shaft 28 for axial movement. The conical members 30 and 34 define therebetween a V-shaped pulley groove therebetween. The follower pulley 26 includes a follower pulley cylinder chamber 32. The movable conical member 34 is axially movable toward the stationary conical member 30 in response to hydraulic pressure developed in the follower pulley cylinder chamber 32. The driver pulley 16, V-belt 24, and the follower pulley 26 form a V-belt type continuously variable power train. The setting is such that the maximum reduction ratio provided by this V-belt type continuously variable power train only is smaller than the reduction ratio provided by a forward gear 42 on the driver shaft side and a forward gear 48 on the output shaft side, which are described later. The driver shaft 14 extends through a hollow shaft 36. The hollow shaft 36 is rotatably supported on the driver shaft 14. Rotatably supported on the hollow shaft 36 are a reverse gear 38 on the driver shaft side and a forward gear 42 on the driver shaft side. The forward gear 42 and the reverse gear 38 are selectivly connected to the hollow shaft 36 by means of a mechanical selector in the form of a synchronous dog clutch 52 having a forward position (F position), a reverse position (R position), and a neutral position. Alternatively, a dog clutch without neutral may be used. With a low clutch 44, the driver shaft 14 is selectively connected to the hollow shaft 36. Extending in parallel to the driver shaft 14 is an output shaft 46. The output shaft 46 has the above-mentioned forward gear 14 mounted thereto via a one-way clutch 40 and a reverse gear 50 for unitary rotation therewith. The forward gear 48 is in constant mesh with the forward gear 42. The reverse gear 50 is in constant mesh with a reverse idler gear 50 that is rotatable with an idler shaft 54. The reverse idler gear 56 is in constant mesh with the reverse gear 38, too. In FIG. 2, since it is impossible to illustrate them in the cross sectional plane, the reverse idler shaft 54 and reverse idler gear 56 are illustrated by the broken line. Actually, they are arranged as illustrated in FIG. 3. In FIG. 2, the shaft distance and the gear diameter do not reflect the actual relationship. Thus, in order to known the actual relationship, reference should be made to FIG. 3. The follower shaft 28 has a forward gear 58. Via a high clutch 60, the forward gear 58 is connected to the follower shaft 28. As best seen in FIG. 3, the forward gear 58 is in constant mesh with the reverse gear 50. The forward gear 58 and the reverse gear 50 have the same diameter. The output shaft 46 has a reduction gear 62 for rotation therewith. The reduction gear 62 is in constant mesh with a final gear 64 of a differential 66. The differential 66 includes a pair of pinion gears 68 and 70 wich are rotatable with the final gear 64. A pair of side gears 72 and 74 mesh with the pinion gears 68 and 70 respectively. The side gears 72 and 74 are coupled with drive shafts 76 and 78, respectively, for rotation therewith.

The neutral state is provided when the low clutch 44 and the high clutch 60 are both released. In this state, the transmission of torque from the driver shaft 14 to the output shaft 46 is interrupted.

On start-up or hill-climbing where a relatively large driving force is required, the forward clutch 52 is engaged and the low clutch 44 engaged. The high clutch 60 is released. In this state, the torque of the output shaft 10a of the engine 10 is transmitted via the torque converter 12 to the driver shaft 14, and further to the hollow shaft 36 via the low clutch 44 that is engaged. The torque of the hollow shaft 36 is transmitted via the dog clutch 52 to the forward gear 42, and further to the forward gear 48 which the gear 42 meshes with. Owing to the fact that the forward gear 48 is drivingly connected via the one-way clutch 40 to the output shaft 46, the torque is transmitted to the output shaft 46. Thereafter, the torque is transmitted via the reduction gear 62 and the final gear 64 to the differential 66 where it is distributed between the drive shafts 76 and 78, causing the wheels of the vehicle, not illustrated, to rotate. During the power transmission mentioned above, the torque is not transmitted through the V-belt type continuously variable transmission, but through the gear power train.

At the reduction ratio provided by the intermeshed forward gears 42 and 48, the torque is increased, thus providing a relatively large driving force.

When the operating condition develops and demands a less driving force, the high clutch 60 is engaged with the above described state maintained. This causes torque transmission through the V-belt type continuously variable power train. The torque of the driver shaft 14 is transmitted via the V-belt 24 and the follower pulley 26 to the follower shaft 28, and further to the forward gear 58 via the high clutch 60 that is engaged. Since the forward clutch 58 meshes with the reverse gear 50, the torque is transmitted to the output shaft 46, and further to the driver shafts 76 and 78 via the same power path as previously described. During transmission of power under this condition, the output shaft 46 rotates at a higher speed than the forward gear 48 does, and thus the one-way clutch 40 idles. This allows the low clutch 44 to be kept engaged. In the manner as described above, the torque is transmitted by the V-belt type continuously variable power train. Thus, the reduction ratio can be varied continuously by varying the width of the V-groove of the driver pulley 26 which in turn induces variation in the width of the follower pulley 26.

Under the condition just mentioned, the low clutch 44 is kept engaged. Alternatively, it may be released.

In establishing the reverse state, the dog clutch 52 is shifted to the R position, causing the reverse gear 38 to rotate with the hollow shaft 36 as a unit, and the low clutch 44 is engaged with the high clutch 60 released. In this state, the torque of the drive shaft 14 is transmitted via the low clutch 44, the hollow shaft 36, the dog clutch 52, the reverse gear 38, the reverse idler gear 56 and the reverse gear 50 to the output shaft 46. Since the reverse idler gear 56 is disposed in the power transmission path, the rotational direction of the output shaft 46 is the opposite to the rotational direction of the output shaft 46. Thus, the vehicle can travel in the reverse direction.

Referring to FIG. 1, there is now described the first embodiment of a system for controlling hydraulic fluid pressure for the automatic transmission as described above.

FIG. 1 shows low clutch 44 and high clutch 66. When the low clutch 44 is engaged with the high clutch 60 released 60, the gear power train is rendered operable to transmit power between the input and output shafts, while when both the low clutch 44 and high clutch 60 are engaged, the V-belt type continuously variable power train is rendered operable to transmit power between the input and output shafts. If desired, the low clutch 44 may be released and the high clutch 60 is released when the V-belt type continuously variable power train is to be rendered operable. Detailed illustration nor description as to the manner of controlling supply and release of hydraulic fluid to and from the low clutch 44 and high clutch 60 is omitted.

In FIG. 1, a pump 100 discharges pressurized hydraulic fluid and thus serves as a source of pressurized hydraulic fluid. In order to supply first hydraulic fluid pressure, namely, clutch activating hydraulic fluid pressure, to the low and high clutches 44 and 60, a master regulator valve 102, a first slave regulator valve 104, a manual valve 108 and a shift valve 110 are operatively connected. The master regulator valve 102 receives pressurized hydraulic fluid from the pump 100 and generates a main system fluid pressure. This main system fluid pressure is supplied via a line 116 to the first slave regulator valve 104 which thus generates the first hydraulic fluid pressure. This first hydraulic fluid pressure is supplied via a line 118 to the manual valve 108. The manual valve 108 has a plurality of range positions including a D (drive) range position. The manual valve 108 cooperates with the shift valve 110 such that the first hydraulic fluid pressure is supplied to the low clutch 44 to engage it with the high clutch 60 released when a predetermined condition fails to be met, while when the predetermined condition is met, the first hydraulic fluid pressure is supplied also to the high clutch 60 to engage the same. For example, the predetermined condition is met when vehicle speed as denoted by $P_G$ and engine throttle opening as denoted by $P_{TH}$ attain a predetermined relationship.

Touching upon a pattern of variation of the main system fluid pressure, with the same engine throttle opening degree, it varies in proportion to pulley ratio, and with the same pulley ratio, it varies in proportion to engine throttle opening degree. A pattern of variation of the first hydraulic fluid pressure is such that with the same throttle opening degree, it keeps a relatively high level until vehicle speed is lower than a predetermined value and drops down to a relatively low level and keeps this relatively low level after vehicle speed has exceeded the predetermined value. These levels increase as the throttle opening degree increases, and the predetermined value shifts toward high vehicle speed side as throttle opening degree increases.

The main system fluid pressure is supplied to a shift control valve 112. The shift control valve 112 receives the main system fluid pressure and regulates fluid supply to and fluid discharge from driver pulley cylinder chamber 20. The shift control valve is well known and disclosed in U.S. Pat. No. 4,735,113 issued to Yamamuro et al. on Apr. 5, 1988.

In order to supply a second hydraulic fluid pressure to follower pulley cylinder chamber 32 when the V-belt type continuously variable power train is rendered operable to transmit power between the input and output shaft, there is provided a second slave regulator valve 106 which receives the main system fluid pressure and generates the second hydraulic fluid pressure when the first hydraulic fluid pressure is applied, as a pilot pressure, to the slave regulator valve 106 in such a direction as to assist the action of a spring 128. This pilot pressure is transmitted from a portion of line 124 upstream of a flow restrictor 126 to the second slave regulator valve 106 via a pilot line 129. For supplying a third hydraulic fluid pressure to the follower pulley cylinder chamber 32 when the V-belt type continuously variable power train is rendered inoperable to transmit power between the input and output shafts, application of the pilot pressure to the second slave regulator valve 106 is stopped because no hydraulic fluid is supplied via the line 124 to the high clutch 60 to render the V-belt type continuously variable power train inoperable. Under this condition, the slave regulator valve 106 generates the third hydraulic fluid pressure which is constant determined by the force of spring 128.

In order for a gradual increase in hydraulic fluid pressure applied to the high clutch 60, a high clutch accumulator 114 is arranged to communicate with a portion of the line downstream of the flow restrictor 126.

From the preceding description, it will now be understood that the third hydraulic fluid pressure is lower than the second hydraulic fluid pressure so that the force which the follower pulley 26 grips the V-belt 24 with drops when the follower pulley cylinder chamber 32 of the pulley unit is supplied with the third hydraulic fluid pressure instead of the second hydraulic fluid pressure. The first hydraulic fluid pressure is lower than the second hydraulic fluid pressure.

The operation of this embodiment is briefly described.

On start-up, where a relatively large driving force is required and vehicle speed is low, the first hydraulic fluid pressure is supplied to the low clutch 44, while no hydraulic fluid pressure is supplied to the high clutch 60. Thus, the gear power train is rendered operable and the V-belt type continuously variable power train is rendered inoperable, thus allowing transmission of power through the gear power train only. Since no hydraulic fluid pressure is applied via the pilot line 129 to the second slave regulator valve 106, the third hydraulic fluid pressure which is lower than the second hydraulic fluid pressure is generated by the second slave regulator valve 106 and supplied to the follower pulley cylinder chamber 32. As a result, the force which the follower pulley 26 grips the V-belt 24 with drops to a negligible low level, inducing substantially no damage or loss on the V-belt 24.

When the operating condition develops and demands a smaller driving force, for example when vehicle speed increases, the first hydraulic fluid pressure is supplied to the line 124 and finally to the high clutch 60 to engage the same. This renders the V-belt type continuously variable power train operable, while rendering the gear power train inoperable. During this transition, the high clutch accumulator 114 functions to allow a gradual increase of hydraulic fluid pressure supplied to the high clutch 60, thus preventing occurrence of shift shock. Since the hydraulic fluid pressure supplied to the high clutch 60 increases at such a gradual rate determined by the high clutch accumulator 114, the first hydraulic fluid is transmitted via the pilot line 129 to the second slave regulator valve 106 before the high clutch 60 is engaged. Thus, the second hydraulic fluid pressure is generated by the second slave regulator valve 106 and supplied to the follower pulley cylinder chamber before the high clutch 60 is engaged. As a result, the force which the follower pulley 26 grips the V-belt 24 with increases to a sufficiently high level. Under this condition, owing to the shift control valve 112, the hydraulic fluid pressure supplied to the driver pulley cylinder chamber 20 is the lowest. Thus, the largest pulley ratio is established. In this manner, the pulley unit is shifted to the state where the power can be transmitted before the high clutch 60 is engaged. Thus, upon completion of engagement of the high clutch 60, the V-belt type continuously variable power train is rendered operable to transmit power between the input and output shafts.

Figure 4:
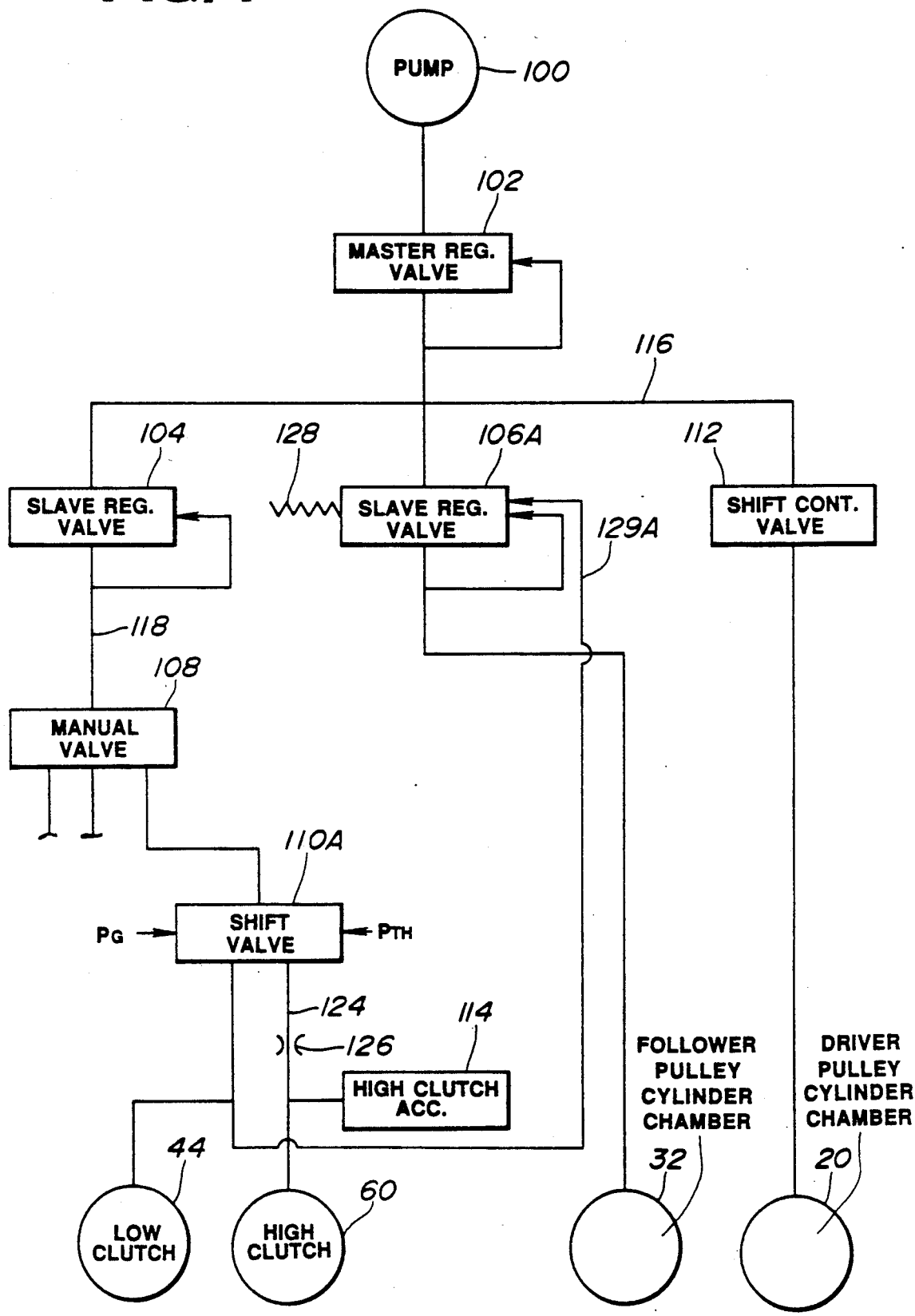
FIG. 4 is a block diagram of a second embodiment.

Referring to FIG. 4, a second embodiment is described. This second embodiment is substantially the same as the first embodiment. However, it is different from the preceding embodiment in that under the control of a modified shift valve 110A, a low clutch 44 is released when a V-belt type continuously variable power train is rendered operable, while the low clutch 44 is kept engaged in the preceding case. Thus, the hydraulic fluid pressure supplied to the low clutch 44 is transmitted as a pilot pressure to a second slave regulator valve 106A via a pilot line 129A. When the gear power train is rendered operable to transmit power between the input and output shafts, the first hydraulic fluid pressure exists in the pilot line 129A, while when the V-belt type continuously variable power train is rendered operable to transmit power between the input and output shafts, the hydraulic pressure in the pilot line drops to zero. Thus, the hydraulic fluid pressure in the pilot line 129A acts on the slave regulator valve 106A against the force of a spring 128.

Figure 5:
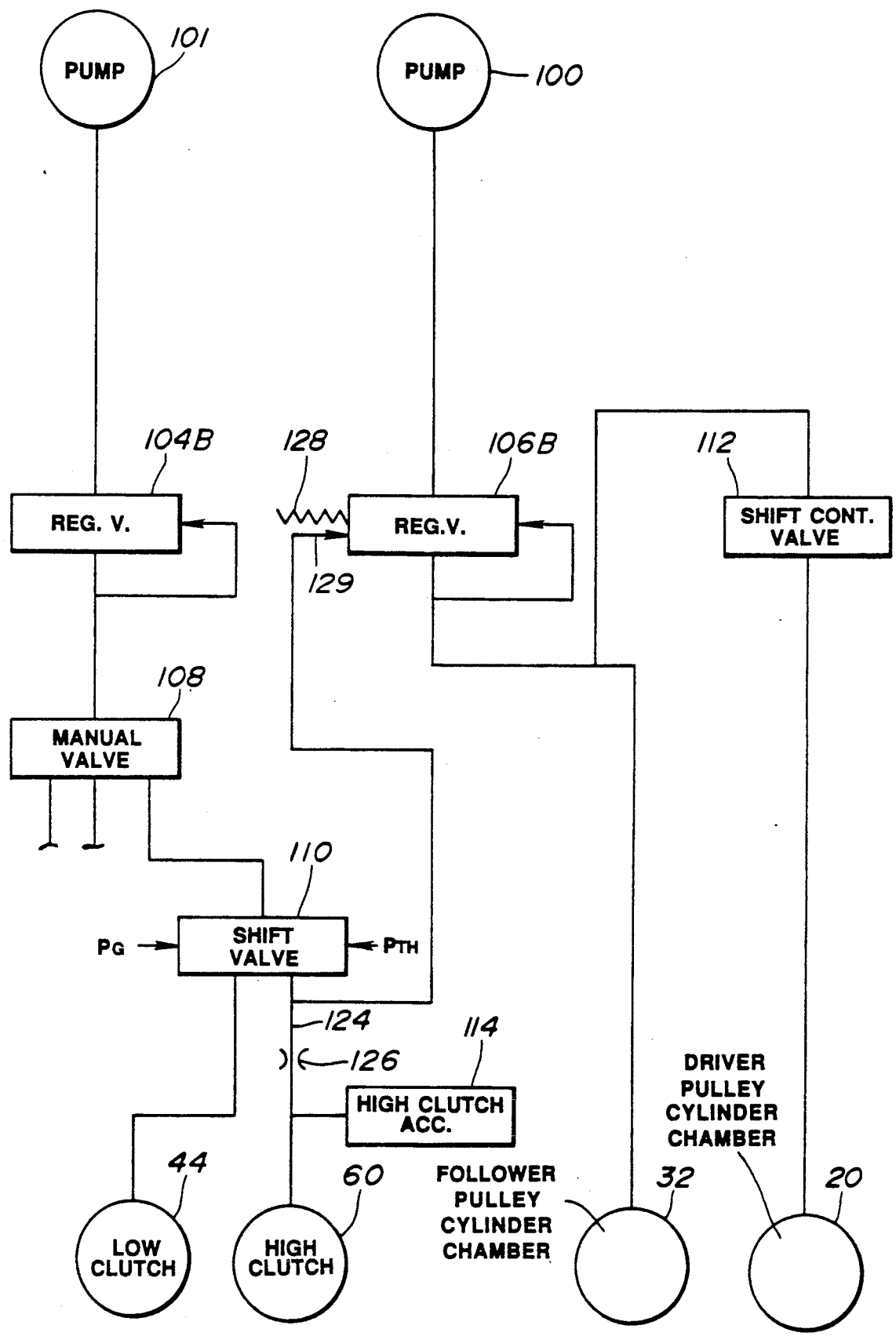
FIG. 5 is a block diagram of a third embodiment.

Referring to FIG. 5, a third embodiment is described. In this embodiment, two pumps 101 and 100 with different capabilities are used. The first pump 101 can discharge hydraulic fluid at a relatively low pressure, while the second pump 100 can discharge hydraulic fluid at a relatively high pressure. The pressurized hydraulic fluid discharged by the first pump 101 is supplied to a first regulator valve 104B which generates a first hydraulic fluid pressure to be supplied to low and high clutches 44 and 60. The pressurized fluid discharged by the second pump 100 is supplied to a second regulator valve 106B. This regulator valve 106B is substantially the same as the second slave regulator valve 106 used in the first embodiment.

Figure 6:
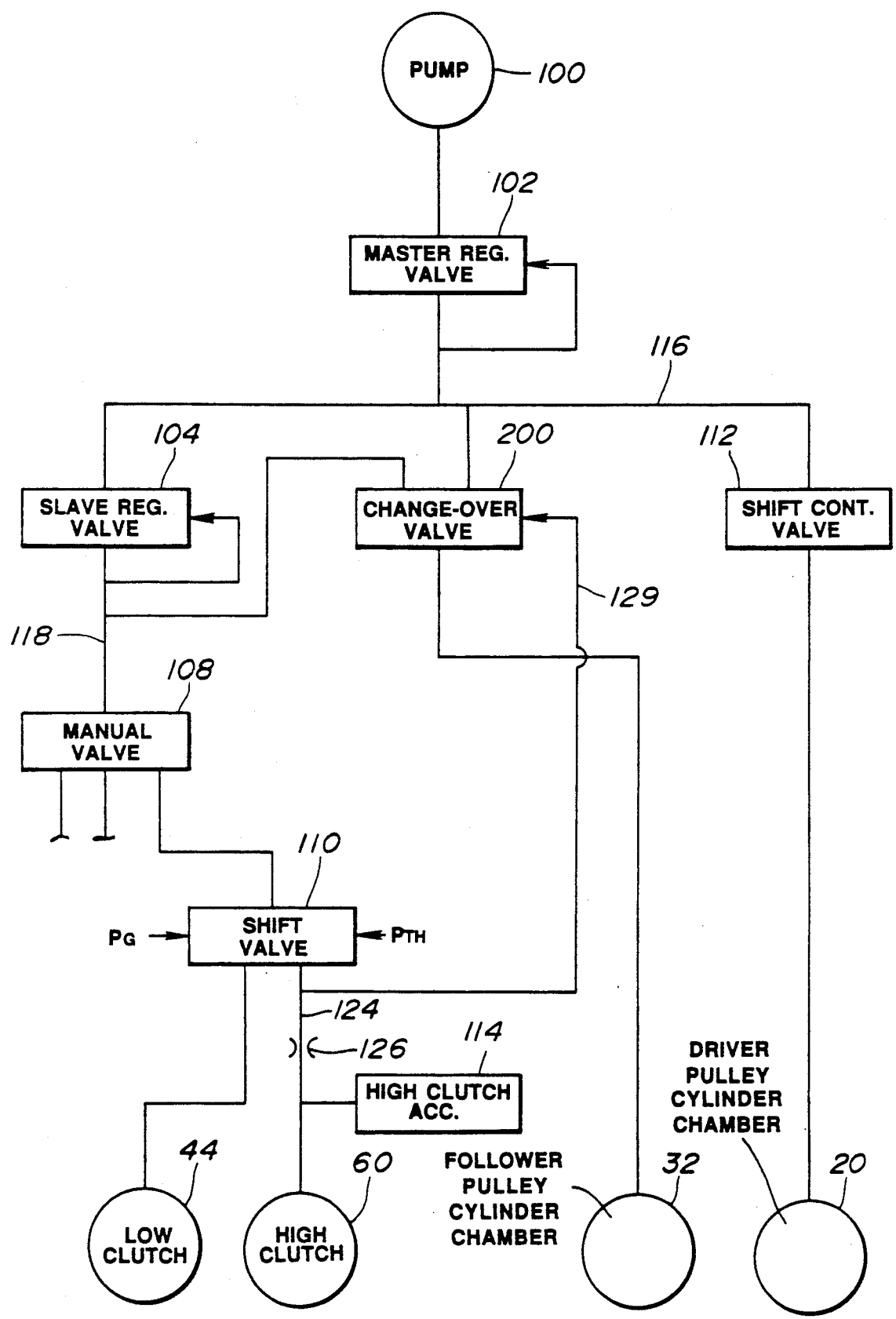
FIG. 6 is a block diagram of a fourth embodiment.

Referring to FIG. 6, a fourth embodiment is described. This embodiment is different from the first embodiment in that a change-over valve 200 is used instead of the second slave regulator valve 106. The change-over valve 200 is shiftable between a spring set position where a follower pulley cylinder chamber 32 is connected to a line 118 to receive a first hydraulic fluid pressure as a third hydraulic fluid pressure, and a hydraulically biased position where the follower pulley cylinder chamber 32 is connected to a line 116 to receive a main system fluid pressure as a second hydraulic fluid pressure. A pilot line 129 leads from a line 124 to the change-over valve 200 to bias the same toward the biased position when the first hydraulic fluid is supplied to the high clutch 60.

Figure 7:
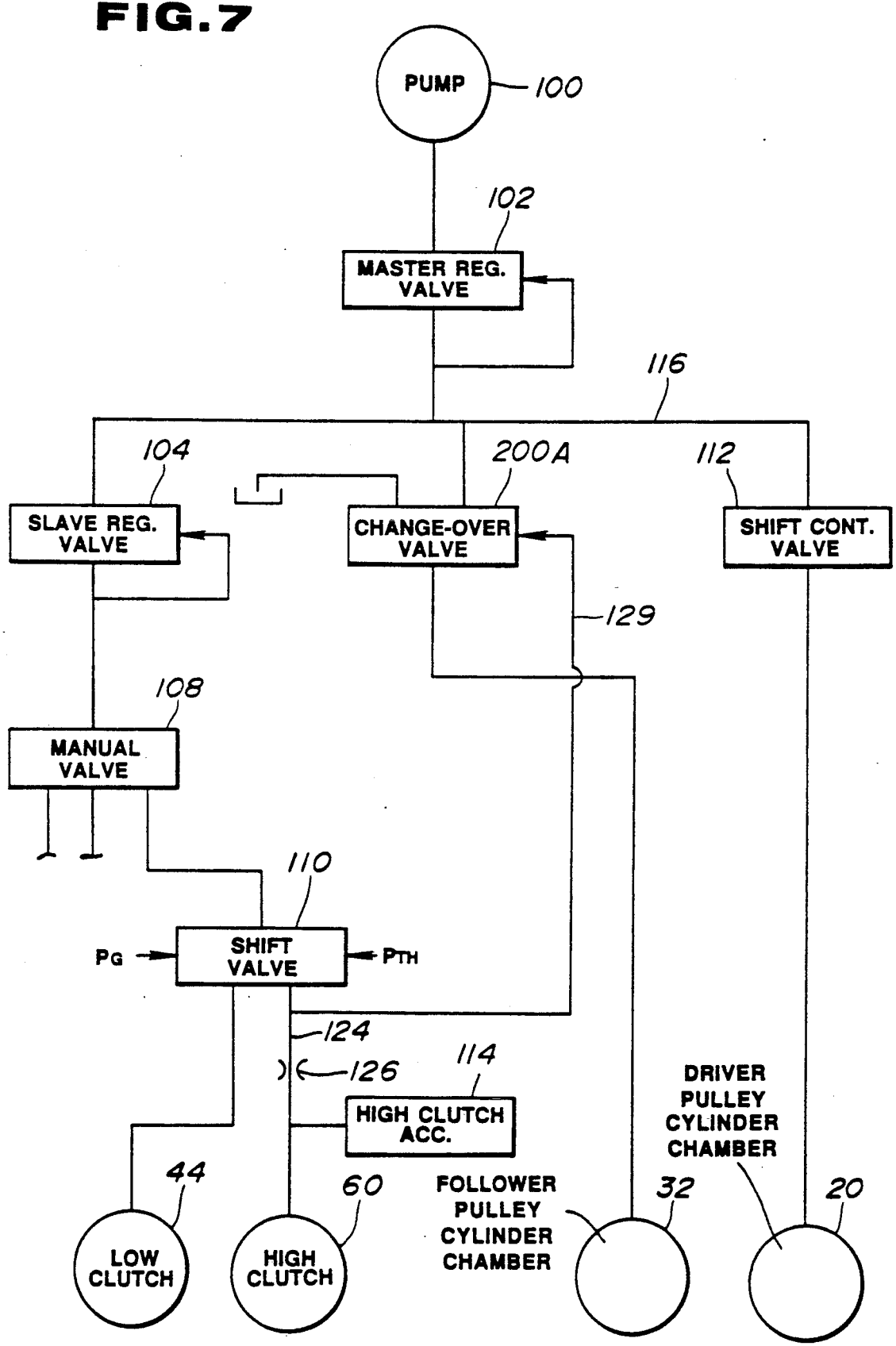
FIG. 7 is a block diagram of a fifth embodiment.

Referring to FIG. 7, a fifth embodiment is described. This embodiment is substantially the same as the just mentioned fourth embodiment except that a change-over valve 200A has a spring set position where a follower pulley cylinder chamber 32 is connected to a drainage to receive zero hydraulic fluid pressure as a third hydraulic fluid pressure.

Figure 8:
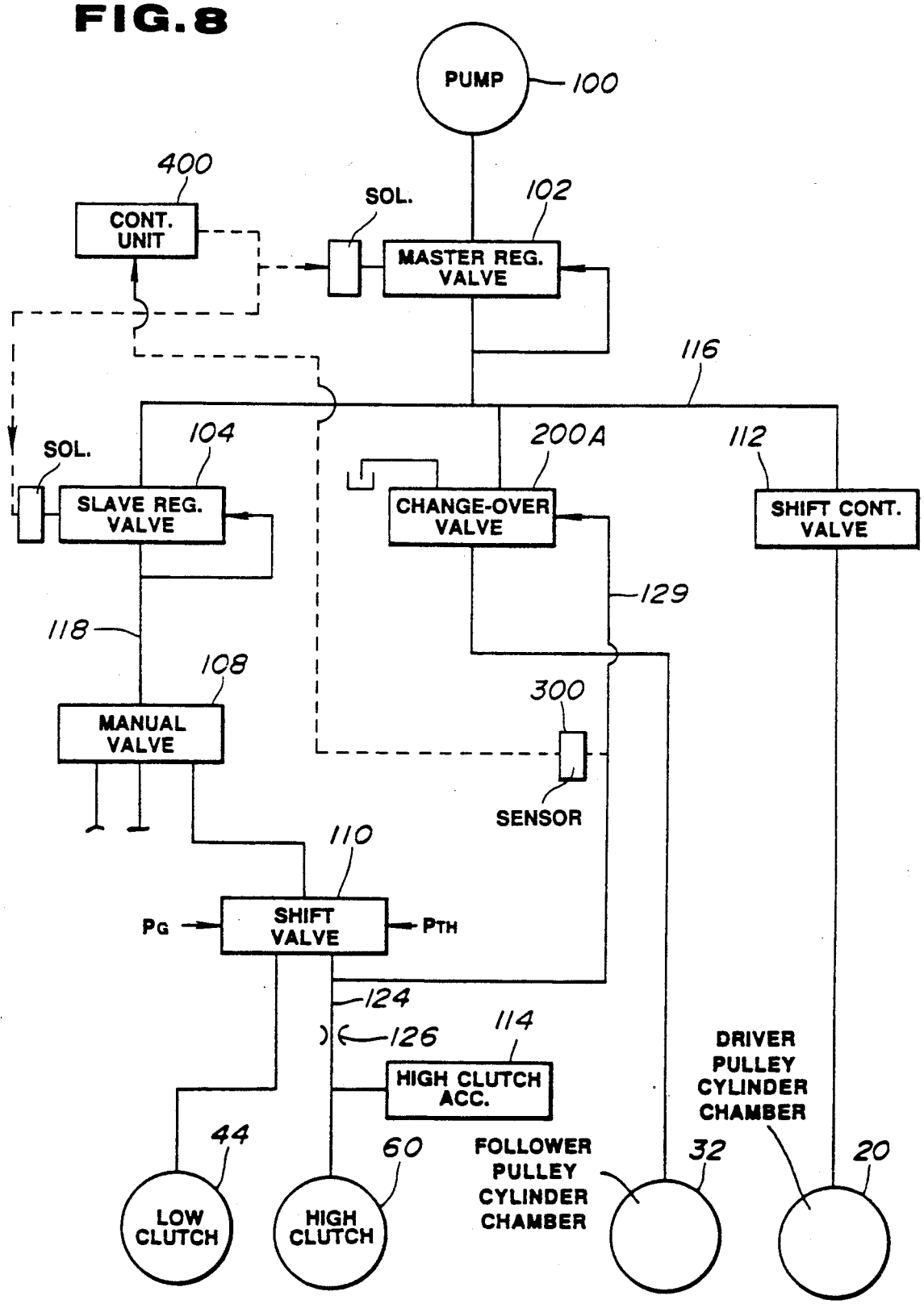
FIG. 8 is a block diagram of a sixth embodiment.

Lastly, referring to FIG. 8, a sixth embodiment is described. This embodiment is different from the fifth embodiment just mentioned in that a master regulator valve 102 and a slave regulator valve 104 are of the solenoid operated type and include solenoid actuators which are under the control of a control unit 400. In order to detect when a V-belt type continuously variable power train is rendered inoperable, a pressure sensor 300 is arranged to detect the hydraulic fluid pressure in a pilot line 129. The output signal of this sensor 300 is supplied to the control unit 400. In operation, the control unit 400 controls the solenoid actuators for the master and slave regulators 102 and 104 such that when the V-belt type continuously variable power train is rendered inoperable, a hydraulic fluid pressure in line 116, which pressure is used as a second hydraulic fluid pressure, drops without causing any drop in the first hydraulic fluid pressure in line 118.

What is claimed is:

1. A system for controlling hydraulic fluid pressure for an automatic transmission including an input shaft and an output shaft, the automatic transmission including a gear power train for transmitting power between the input and output shafts and a V-belt type continuously variable power train for transmitting power between the input and output shaft, the V-belt type continuously variable power train being connected in parallel with the gear power train such that the V-belt type continuously variable power train does not transmit power between the input and output shafts when the gear power train is rendered operable to transmit power between the input and output shafts, while the gear power train does not transmit power between the input and output shafts when the V-belt type continuously variable power train is rendered operable to transmit power between the input and output shafts, the V-belt type continuously variable power train having a pulley unit including a driver pulley, a follower pulley, and a V-belt drivingly connected between the driver and follower pulleys, the system comprising:

means for rendering the gear power train and the V-belt type continuously variable power train selectively operable, said rendering means assuming a first state when the V-belt type continuously variable power train is rendered operable and the gear power train is rendered inoperable, said rendering means assuming a second state when the V-belt type continuously variable power train is rendered inoperable and the gear power train is rendered operable;

means for supplying a first hydraulic fluid pressure to said rendering means;

means responsive to said rendering means for supplying a second hydraulic fluid pressure to a predetermined portion of the pulley unit when said rendering means assumes said first state thereof, and supplying a third hydraulic pressure, instead of said second hydraulic fluid pressure, to said predetermined portion of the pulley unit when said rendering means assumes said second state thereof;

said third hydraulic fluid pressure being lower than said second hydraulic fluid pressure.

2. A system as claimed in claim 1, wherein said first hydraulic fluid pressure supplying means include master regulator valve means for generating a main system fluid pressure, and first slave regulator valve means receiving said main system fluid pressure for generating said first hydraulic fluid pressure; wherein said second hydraulic fluid pressure supplying means include second slave regulator valve means for receiving said main system fluid pressure and generating said second hydraulic fluid pressure when the V-belt type continuously variable power train is rendered operable and the gear power train is rendered inoperable and said third hydraulic fluid pressure when the V-belt type continuously variable power train is rendered inoperable and the gear power train is rendered operable.

3. A system as claimed in claim 2, wherein said second hydraulic fluid pressure is as high as said main system fluid pressure.

4. A system as claimed in claim 2, wherein said rendering means include means for applying said first hydraulic fluid pressure to said second slave regulator valve means when the V-belt type continuously variable power train is rendered inoperable and the gear power train is rendered operable and discharging said first hydraulic fluid pressure applied to said second slave regulator valve means when the V-belt type continuously variable power train is rendered operable and the gear power train is rendered inoperable.

5. A system as claimed in claim 2, wherein said rendering means include means for applying said first hydraulic fluid pressure to said second slave regulator valve means when the V-belt type continuously variable power train is rendered inoperable and said gear power train is rendered operable and for discharging said first hydraulic fluid pressure applied to said second slave regulator valve means when the V-belt type continuously variable power train is rendered operable and the gear power train is rendered inoperable.

6. A system as claimed in claim 1, wherein said first hydraulic fluid pressure supplying means include first pump means for generating a first pressurized hydraulic fluid, and first regulator valve means receiving said first pressurized fluid for generating said first hydraulic fluid pressure; wherein said second hydraulic fluid pressure supplying means include second pump means for generating a second pressurized hydraulic fluid, and second regulator valve means receiving said second pressurized hydraulic fluid for generating said second hydraulic fluid pressure when the V-belt type continuously variable power train is rendered operable and the gear power train is rendered inoperable and said third hydraulic fluid pressure instead of said second hydraulic fluid pressure when the V-belt type continuously variable power train is rendered inoperable and the gear power train is rendered operable.

7. A system as claimed in claim 6, wherein said rendering means include means for applying said first hydraulic fluid pressure to said second regulator valve means when the V-belt type continuously variable power train is rendered operable and the gear power train is rendered inoperable and discharging said first hydraulic fluid pressure applied to said second regulator valve means when the V-belt type continuously variable power train is rendered inoperable and the gear power train is rendered operable.

8. A system as claimed in claim 1, wherein said first hydraulic fluid pressure supplying means include master regulator valve means for generating a main system fluid pressure, and slave regulator valve means receiving said main system hydraulic fluid pressure for generating said first hydraulic fluid pressure; and wherein said second hydraulic fluid pressure supplying means include change-over valve means for allowing said main system fluid pressure to be supplied to said predetermined portion of the pulley unit as said second hydraulic fluid pressure when the V-belt type continuously variable power train is rendered operable and the gear power train is rendered inoperable and allowing said first hydraulic fluid pressure to be supplied to said predetermined portion of the pulley unit as said third hydraulic fluid pressure instead of said second hydraulic fluid pressure when the V-belt type continuously variable power train is rendered inoperable and the gear power train is rendered operable.

9. A system as claimed in claim 1, wherein said first hydraulic fluid pressure supplying means master regulator valve means for generating a main system fluid pressure, and slave regulator valve means receiving said main system fluid pressure for generating said first hydraulic fluid pressure; and wherein said second hydraulic fluid pressure supplying means include change-over valve means for allowing said main system fluid pressure to be supplied to said predetermined portion of the pulley unit as said second hydraulic fluid pressure when the V-belt type continuously variable power train is rendered operable and the gear power train is rendered inoperable and allowing zero hydraulic fluid pressure to be supplied to said predetermined portion of the pulley unit as said third hydraulic fluid pressure instead of said second hydraulic fluid pressure when the V-belt type continuously variable power train is rendered inoperable and said gear power train is rendered operable.

10. A system as claimed in claim 9, wherein said master regulator valve means is of the solenoid operated type including a first solenoid actuator, and said slave regulator valve means is of the solenoid operated type including a second solenoid actuator, and wherein said second hydraulic fluid pressure supplying means include control means for controlling said first and second solenoid actuators such that said second hydraulic fluid pressure drops without causing any drop in said first hydraulic fluid pressure when the V-belt type continuously variable power train is rendered inoperable and the gear power train is rendered operable.

11. A system as claimed in claim 1, wherein said predetermined portion of the pulley unit is the follower pulley.

12. A system as claimed in claim 11, further comprising:
shift control valve means fluidly disposed between said first hydraulic fluid supplying means and the driver pulley of the pulley unit.

13. A system as claimed in claim 11, further comprising:
shift control valve means fluidly disposed between said second hydraulic fluid supplying means and the driver pulley of the pulley unit.

14. A system for controlling hydraulic fluid pressure for an automatic transmission including an input shaft and an output shaft, the automatic transmission including a gear power train for transmitting power between the input and output shafts and a V-belt type continuously variable power train for transmitting power between the input and output shafts, the V-belt type continuously variable power train being connected in parallel with the gear power train such that the V-belt type continuously variable power train does not transmit power between the input and output shafts when the gear power train is rendered operable to transmit power between the input and output shafts, while the gear power train does not transmit power between the input and output shafts when the V-belt type continuously variable power train is rendered operable to transmit power between the input and output shafts, the V-belt type continuously variable power train having a pulley unit including a driver pulley, a follower pulley, and a V-belt drivingly connected between the driver and follower pulleys, the system comprising:
means for controlling supply of hydraulic fluid to and discharge thereof from one of the driver pulley and the follower pulley of the pulley unit;
means for rendering the gear power train and the V-belt type continuously variable power train selectively operable, said rendering means assuming a first state when the V-belt type continuously variable power train is rendered operable and the gear power train is rendered inoperable, said rendering means assuming a second state when the V-belt type continuously variable power train is rendered inoperable and the gear power train is rendered operable;
means for supplying a first hydraulic fluid pressure to said rendering means;
means responsive to said rendering means for supplying a second hydraulic fluid pressure to the other of the driver pulley and the follower pulley of the pulley unit when said rendering means assumes said first state thereof, and supplying a third hydraulic pressure, instead of said second hydraulic fluid pressure, to said predetermined portion of the pulley unit when said rendering means assumes said second state thereof; and said third hydraulic fluid pressure being lower than said second hydraulic fluid pressure.

15. A system as claimed in claim 14, wherein said controlling means include a shift control valve fluidly disposed between said first hydraulic fluid supplying means and the pulley unit.

16. A system as claimed in claim 14, wherein said controlling means include a shift control valve fluidly disposed between said second hydraulic fluid supplying means and the pulley unit.

17. A system as claimed in claim 15, wherein said one of the driver pulley and the follower pulley is the driver pulley, and said the other of the driver pulley and the follower pulley is the follower pulley.

* * * * *